United States Patent [19]

Nakanishi et al.

[11] Patent Number: 4,478,182

[45] Date of Patent: Oct. 23, 1984

[54] HELICALLY-SHAPED INTAKE PORT OF AN INTERNAL COMBUSTION ENGINE

[75] Inventors: Kiyoshi Nakanishi; Takeshi Okumura; Mutsumi Kanda; Takeshi Kotani, all of Susono; Tokuta Inoue, Mishima, all of Japan

[73] Assignee: Toyota Jidosha Kabushiki Kaisha, Aichi, Japan

[21] Appl. No.: 490,339

[22] Filed: May 2, 1983

[30] Foreign Application Priority Data

May 11, 1982 [JP] Japan .................................. 57-077477
Jun. 21, 1982 [JP] Japan .................................. 57-105470

[51] Int. Cl.³ .............................................. F02F 1/42
[52] U.S. Cl. .................................. 123/188 M; 123/308
[58] Field of Search ............... 123/188 M, 52 M, 306, 123/308, 432

[56] References Cited

U.S. PATENT DOCUMENTS

| | | | |
|---|---|---|---|
| 3,850,479 | 11/1974 | Boyhont et al. ........................ | 302/29 |
| 3,884,209 | 5/1975 | List et al. ......................... | 123/188 M |
| 4,159,011 | 6/1979 | Spenny ............................ | 123/188 M |
| 4,174,686 | 11/1979 | Shimizu et al. ...................... | 123/308 |
| 4,201,165 | 5/1980 | Tanaka et al. ....................... | 123/568 |
| 4,246,874 | 1/1981 | Nakagawa et al. ................... | 123/308 |
| 4,253,432 | 3/1981 | Nohira et al. ..................... | 123/52 M |
| 4,256,062 | 3/1981 | Schafer ............................ | 123/52 M |
| 4,257,384 | 3/1981 | Matsumoto .......................... | 123/575 |
| 4,286,554 | 9/1981 | Okamoto ........................... | 123/188 M |
| 4,312,309 | 1/1982 | Nakanishi et al. .............. | 123/188 M |
| 4,411,226 | 10/1983 | Okumura et al. .............. | 123/188 M |
| 4,438,741 | 3/1984 | Okumura et al. ................ | 123/188 M |

FOREIGN PATENT DOCUMENTS

| | | | |
|---|---|---|---|
| 2059008 | 6/1972 | Fed. Rep. of Germany . | |
| 143289 | 8/1980 | German Democratic Rep. ............... | 123/188 M |
| 52-127113 | 9/1977 | Japan . | |
| 54-58129 | 5/1979 | Japan . | |
| 35177 | 3/1980 | Japan ........................... | 123/188 M |
| 56-54922 | 5/1981 | Japan . | |
| 57-68519 | 4/1982 | Japan . | |
| 183521 | 11/1982 | Japan ................................. | 123/306 |
| 28525 | 2/1983 | Japan ................................. | 123/306 |

*Primary Examiner*—Ira S. Lazarus
*Attorney, Agent, or Firm*—Parkhurst & Oliff

[57] ABSTRACT

An engine comprising an intake port which has a separating wall projecting downward from the upper wall of the intake port. The separating wall defines a helical portion, an inlet passage portion tangentially connected to the helical portion, and a bypass passage interconnecting the inlet passage portion to the helical portion. A rotary valve is arranged in the bypass passage and actuated by a vacuum operated diaphragm apparatus. The rotary valve is opened when the amount of air fed into the cylinder of an engine is increased beyond a predetermined value. A conical shaped groove is formed on the bottom wall of the intake port. The lower end of the rotary valve is located in the groove.

20 Claims, 17 Drawing Figures

Fig. 12
(a)
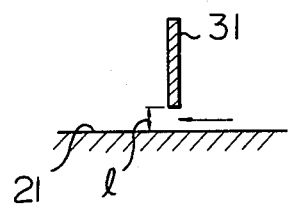
(b)
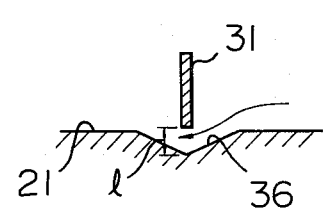
Fig. 13
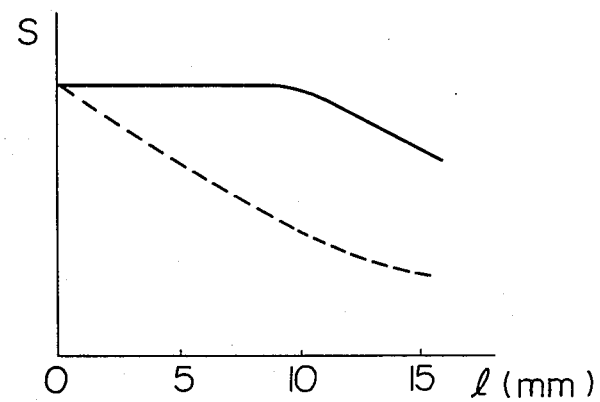

HELICALLY-SHAPED INTAKE PORT OF AN INTERNAL COMBUSTION ENGINE

BACKGROUND OF THE INVENTION

The present invention relates to a helically-shaped intake port of an internal combustion engine.

A helically-shaped intake port normally comprises a helical portion formed around the intake valve of an engine, and a substantially straight inlet passage portion tangentially connected to the helical portion. However, if such a helically-shaped intake port is so formed that a strong swirl motion is created in the combustion chamber of an engine when the engine is operating at a low speed under a light load, that is, when the amount of air fed into the cylinder of the engine is small, since air flowing within the helically-shaped intake port is subjected to a great flow resistance, a problem occurs in that the volumetric efficiency is reduced when the engine is operating at a high speed under a heavy load, that is, when the amount of air fed into the cylinder of the engine is large.

In order to eliminate such a problem, the inventor has proposed a helically-shaped intake port in which a bypass passage, branched off from the inlet passage portion and connected to the helix terminating portion of the helical portion, is formed in the cylinder head of an engine. A flow control valve is arranged in the bypass passage and opened when the engine is operating under a heavy load at a high speed. In this helically-shaped intake port, when the engine is operating under a heavy load at a high speed, a part of the air introduced into the inlet passage portion is fed into the helical portion of the helically-shaped intake port via the bypass passage. Consequently, since the flow area of the intake port is increased when the engine is operating under a heavy load at a high speed, it is possible to increase the volumetric efficiency. However, in this helically-shaped intake port, since the bypass passage is formed by a tubular passage which is completely separated from the inlet passage portion, the bypass passage has a relatively great flow resistance. In addition, since it is necessary to form the bypass passage at a position adjacent to the inlet passage portion, the cross-sectional area of the bypass passage is restricted by the presence of the inlet passage portion. Consequently, it is difficult to obtain a satisfactorily high volumetric efficiency. In addition, the helically-shaped intake port has a complicated construction itself and, thus, if the bypass passage completely separated from the inlet passage portion is additionally provided, the entire construction of the intake port becomes extremely complicated. Therefore, it is considerably difficult to form the helically-shaped intake port equipped with such a bypass passage in the cylinder head.

SUMMARY OF THE INVENTION

An object of the present invention is to provide a helically-shaped intake port having a novel construction which can be easily manufactured and is capable of obtaining a high volumetric efficiency when the engine is operating under a heavy load at a high speed.

According to the present invention, there is provided an intake device of an internal combustion engine comprising: an intake valve having a valve stem; an axially extending intake port passage having an inlet opening at one end thereof and having an outlet opening at the other end thereof, the intake port passage having a substantially cylindrically extending circumferential wall which circumferentially extends about the valve stem, a first side wall which extends between the inlet opening and said circumferential wall along an axis of the intake port passage, a second side wall which extends between the inlet opening and the circumferential wall along the axis of the intake port passage and is arranged to face the first side wall, an upper wall which extends between the inlet opening and the circumferential wall along the axis of the intake port passage, and a bottom wall which extends between the inlet opening and the circumferential wall along the axis of the intake port passage; a separating wall projecting downward from the upper wall and spaced from the bottom wall, the separating wall extending along the axis of the intake port passage and being spaced from the circumferential wall for defining a helical portion having a helix terminating portion between the separating wall and the circumferential wall, the separating wall being spaced from the first side wall for defining therebetween an inlet passage portion tangentially connected to said helical portion, the separating wall being spaced from the second side wall for defining therebetween a bypass passage which interconnecting the inlet passage portion to the helix terminating portion; normally closed rotary valve arranged in the bypass passage and having a thin plate-shaped valve body which extends between the upper wall and the bottom wall for controlling the flow area of the bypass passage, the bottom wall having a groove formed thereon, the valve body having a lower and which is located in the groove; and an actuating means for actuating the rotary valve rn response to the change in the operating condition of the engine to open rotary valve when the engine is operating at a high speed under a heavy load.

The present invention may be more fully understood from the description of a preferred embodiment of the invention set forth below, together with the accompanying drawings.

BRIEF DESCRIPTION OF THE DRAWINGS

In the drawings:

FIGS. 12(a) and 12(b) are side views of the bypass passage illustrating the stream of mixture;

FIG. 13 is a diagram of the intensity of the swirl motion;

DESCRIPTION OF THE PREFERRED EMBODIMENT

Figure 1:
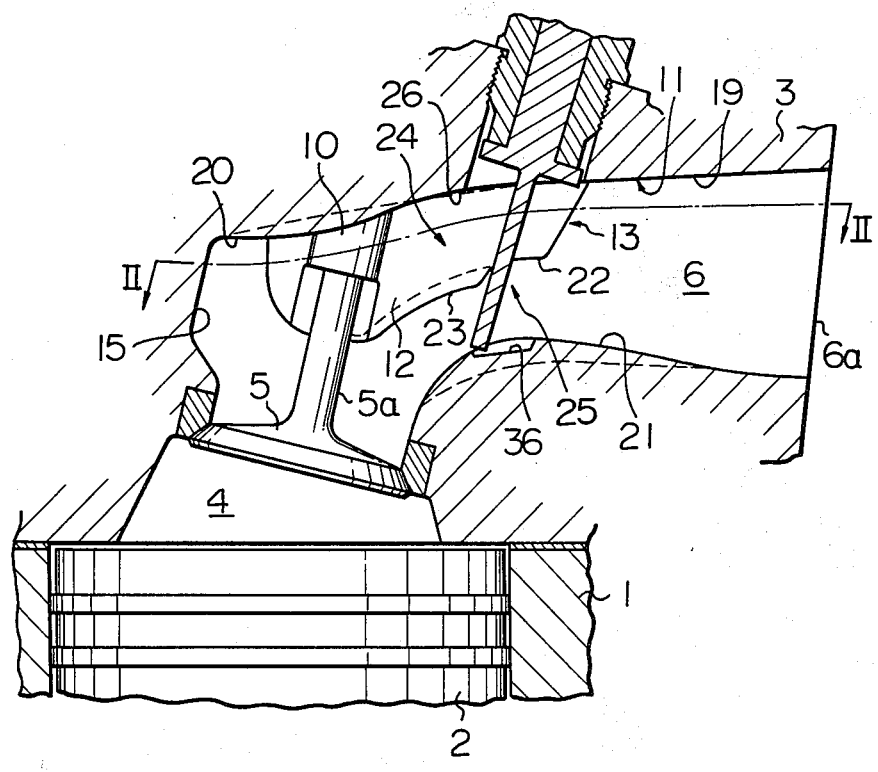
FIG. 1 is a cross-sectional side view of an internal combustion engine according to the present invention, taken along the line I—I in FIG. 2.
Figure 2:
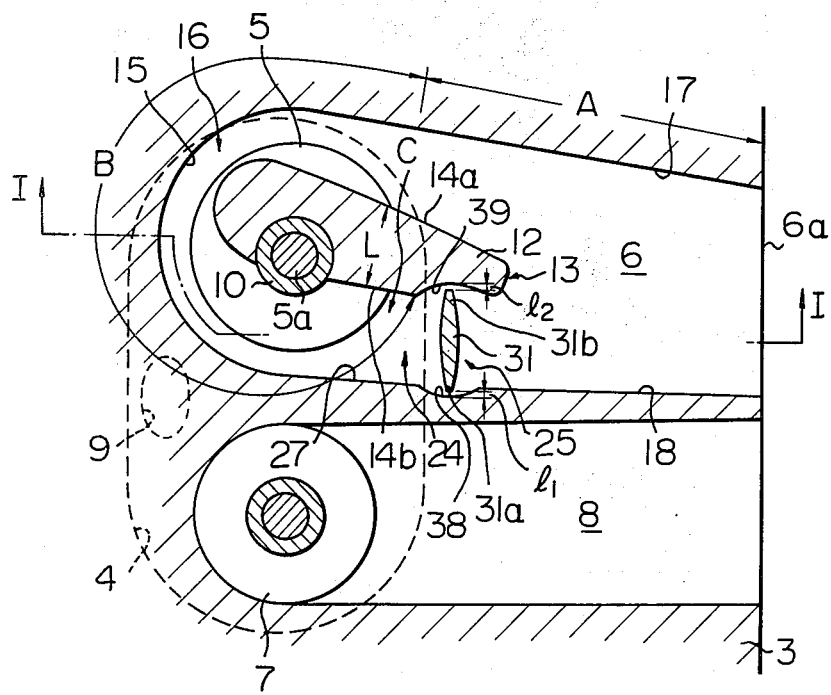
FIG. 2 is a cross-sectional plan view taken along the line II—II in FIG. 1.

Referring to FIGS. 1 and 2, reference numeral 1 designates a cylinder block, 2 a piston reciprocally movable in the cylinder block 1, 3 a cylinder head fixed onto the cylinder block 1, and 4 a combustion chamber formed between the piston 2 and the cylinder head 3; 5 designates an intake valve, 6 a helically-shaped intake port formed in the cylinder head 3, 7 an exhaust valve, and 8 and exhaust port formed in the cylinder head 3; 9 designates a spark plug arranged in the combustion chamber 4, and 10 a stem guide for guiding the stem 5a of the intake valve 5. As illustrated in FIGS. 1 and 2, a downwardly projecting separating wall 12 is formed in one piece on the upper wall 11 of the intake port 6, and the helical portion B and the inlet passage portion A tangentially connected to the helical portion B are formed by the separating wall 12. The separating wall 9 extends from the interior region of the inlet passage portion A to the region around the stem 5a of the intake valve 5 and, from FIG. 2, it is understood that the width L of the root portion of the separating wall 12 is gradually increased as the measuring point of the width L approaches the stem guide 10 from the inlet passage portion A. The separating wall 12 has a tip portion 13 located at a position which is nearest the inlet opening 6a of the intake port 6. In addition, the separating wall 12 comprises a first side wall 14a extending counterclockwise in FIG. 2 from the tip portion 13 to the stem guide 10, and a second side wall 14b extending clockwise in FIG. 2 from the tip portion 13 to the stem guide 10. The first side wall 14a extends near the stem guide 10 from the tip portion 13 to a position near the side wall 15 of the helical portion B, and the first side wall 14a and the side wall 15 define a narrow passage portion 16 therebetween. Then, the first side wall 14a extends to the stem guide 10 while curving so that the first side wall 14a gradually leaves the side wall 15 of the helical portion B. The second side wall 14b extends substantially straight from the tip portion 13 to the stem guide 10.

Figure 3:
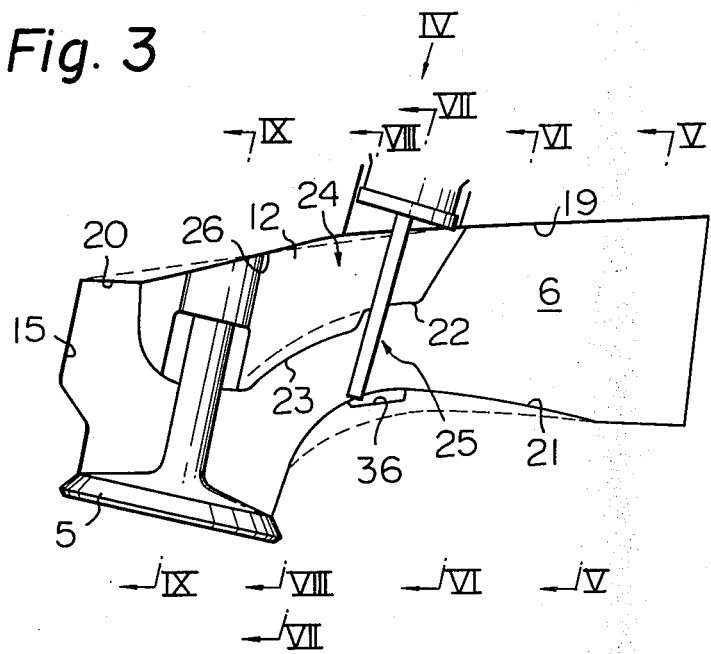
FIG. 3 is a side view of a helically-shaped intake port according to the present invention.
Figure 4:
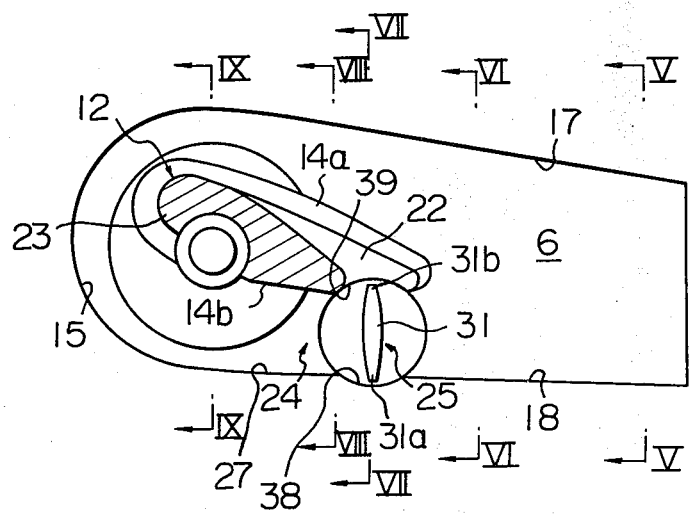
FIG. 4 is a plan view of a helically-shaped intake port according to the present invention.
Figure 5:
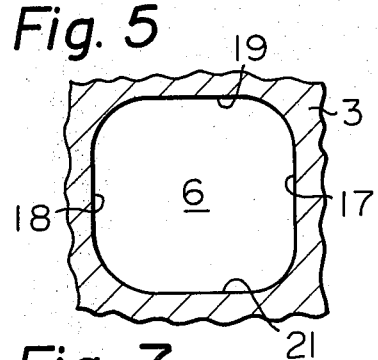
FIG. 5 is a cross-sectional view taken along the line V—V in FIGS. 3 and 4.
Figure 6:
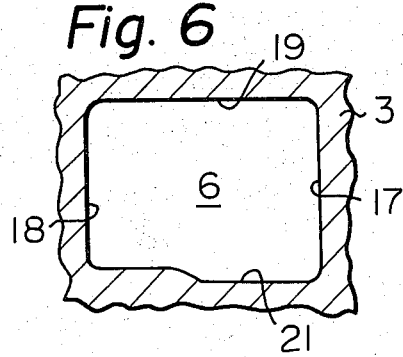
FIG. 6 is a cross-sectional view taken along the line VI—VI in FIGS. 3 and 4.
Figure 7:
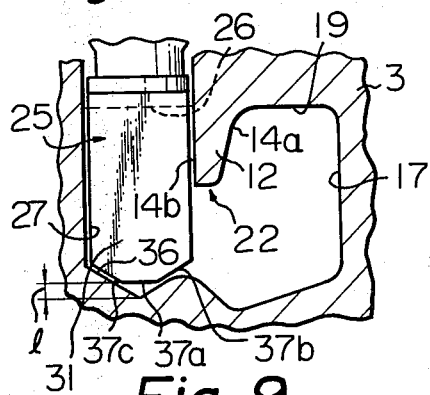
FIG. 7 is a cross-sectional view taken along the line VII—VII in FIGS. 3 and 4.
Figure 8:
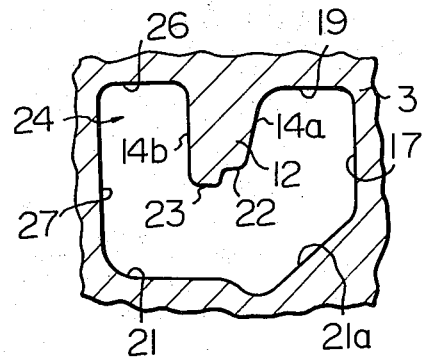
FIG. 8 is a cross-sectional view taken along the line VIII—VIII in FIGS. 3 and 4.
Figure 9:
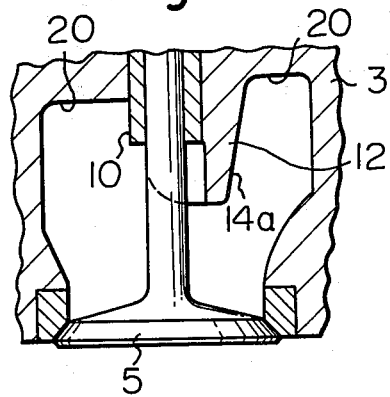
FIG. 9 is a cross-sectional view taken along the line IX—IX in FIGS. 3 and 4.

Referring to FIGS. 1 through 9, the side walls 17, 18 of the inlet passage portion A are substantially vertically arranged, and the upper wall 19 of the inlet passage portion A gradually descends toward the helical portion B. The side wall 17 of the inlet passage portion A is smoothly connected to the side wall 15 of the helical portion B, and the upper wall 19 of the inlet passage portion A is smoothly connected to the upper wall 20 of the helical portion B. The upper wall 20 of the helical portion B gradually descends toward the narrow passage portion 16 from the connecting portion of the inlet passage portion A and the helical portion B. In addition, the width of the upper wall 20 of the helical portion B is gradually reduced toward the narrow passage portion 16 from the connecting portion of the inlet passage portion A and the helical portion B. Then, the width of the upper wall 20 is gradually increased toward the helix terminating portion C of the helical portion B from the narrow passage portion 16. The entire bottom wall 21 of the inlet passage portion A is substantially horizontally arranged at a position near the inlet opening 6a of the intake port 6 as illustrated in FIG. 5. As the bottom wall 21 approaches the helical portion B, the bottom wall portion 21a located adjacent to the side wall 17 is gradually raised and forms as inclined face as illustrated in FIG. 8. The inclined angle of the bottom wall portion 21a is gradually increased toward the helical portion B.

The first side wall 14a of the separating wall 12 is slightly inclined so as to be directed downward, and the second side wall 14b is substantially vertically arranged. The bottom face 22 of the separating wall 12 descends, while slightly curving, toward the helical portion B from the inlet passage portion A so that the distance between the bottom face 22 of the separating wall 12 and the upper wall 19 of the inlet passage portion A is gradually increased toward the stem guide 10 from the tip portion 13. A downwardly projecting rib 23 is formed on the bottom face 22 of the separating wall 12 in a region illustrated by the hatching in FIG. 4, and the bottom face of the rib 23 and the bottom face 22 form a slightly curved and inclined face.

A bypass passage 24, interconnecting the inlet passage portion A to the helix terminating portion C of the helical portion B, is formed in the cylinder head 3, of the bypass passage 24. The bypass passage 24 is separated from the inlet passage portion A by the separating wall 12, and the lower space of the bypass passage 24 is in communication with the inlet passage portion A over the entire length of the bypass passage 24. The upper wall 26 of the bypass passage 24 has an approximately uniform width. This upper wall 26 gradually descends toward the helix terminating portion C and is smoothly connected to the upper wall 20 of the helical portion B. The side wall 27 of the bypass passage 24, which faces the second side wall 14b of the separating wall 12, is substantially vertically arranged and located approximately on the extension of the side wall 18 of the inlet passage portion A. As can be seen from FIG. 1, the rib 23 extends toward the intake valve 5 from a position near the rotary valve 25.

Figure 10:
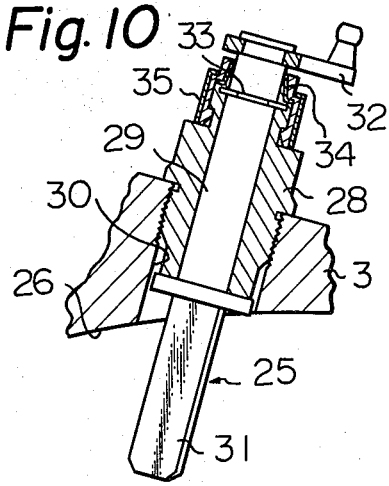
FIG. 10 is a cross-sectional side view of a rotary valve.

As illustrated in FIG. 10, the rotary valve 25 comprises a rotary valve holder 28 and a valve shaft 29 rotatably supported by the rotary valve holder 28. The rotary valve holder 28 is screwed into the fixed into a valve insertion bore 30 formed in the cylinder head 3. A thin plate-shaped valve body 31 is formed on the lower end of the valve shaft 29 and extends between the bottom wall 21 and the upper wall 26 of the bypass passage 24 as illustrated in FIG. 1. An arm 32 is attached to the top end of the valve shaft 29. A ring groove 33 is formed on the outer circumferential wall of the valve shaft 29, and an E-shaped positioning ring 34 is fitted into the ring groove 33. In addition, a seal member 35 is fitted onto the upper portion of the rotary valve holder 28, and the sealing operation of the valve shaft 29 is carried out by means of the seal member 35.

As illustrated in FIGS. 1, 3, and 7, a conical shaped groove 36 is formed on the bottom wall 21 facing the lower end of the valve body 31, and the lower end of the valve body 31 is inserted into the conical groove 36. As illustrated in FIG. 7, the lower end of the valve body 31 comprises a central flat portion 37a and inclined portions 37b, 37c arranged on each side of the central flat portion 37a, and a uniform small gap is formed between the bottom wall of the conical groove 36 and the inclined portions 37b, 37c. In addition, as illustrated in FIGS. 2 and 4, a cylindrical shaped groove 38 is formed on the side wall 27 of the bypass passage 24, which side wall faces one of the peripheral edges 31a of the valve body 31, and the peripheral edge 31a of the valve body 31 enters into the cylindrical groove 38 when the rotary valve 25 is in the closed position as illustrated in FIGS. 2 and 4. At this time, the peripheral edge 31a of the valve body 31 is spaced from the side wall of the groove 38 by a distance $l_1$. In addition, another cylindrical shaped groove 39 is formed on the second side wall 14b of the separating wall 12, which second side wall faces the other peripheral edge 31b of the valve body 31, and the peripheral edge 31b of the valve body 31 enters into the cylindrical groove 39 when the rotary valve 25 is in the closed position as illustrated in FIGS. 2 and 4. At this time, the peripheral edge 31b of the valve body 31 is spaced from the side wall of the groove 39 by a distance $l_2$. As will be understood from FIG. 4, the center of a circle defining the cylindrical grooves 38, 39 is positioned on the rotating axis of the rotary valve 25.

Figure 11:
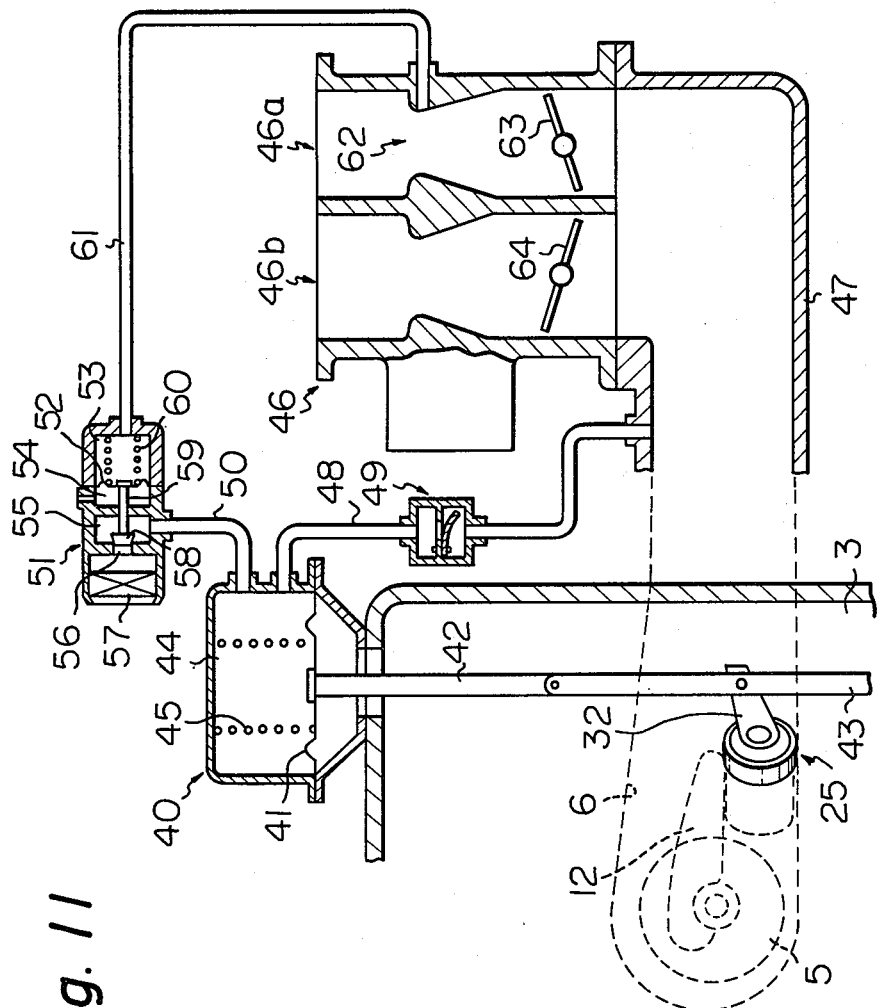
FIG. 11 is a view of a rotary valve drive control device.

Referring to FIG. 11, the tip of the arm 32 fixed onto the top end of the rotary valve 25 is connected via a connecting rod 43 to a control rod 42 which is fixed onto a diaphragm 41 of a vacuum operated diaphragm apparatus 40. The diaphragm apparatus 40 comprises a vacuum chamber 44 separated from the atmosphere by the diaphragm 41, and a compression spring 45 for biasing the diaphragm 41 is inserted into the vacuum chamber 44.

An intake manifold 47, equipped with a compound type carburetor 46 comprising a primary carburetor 46a and a secondary carburetor 46b, is mounted on the cylinder head 3, and the vacuum chamber 44 is connected to the interior of the intake manifold 47 via a vacuum conduit 48. A check valve 49, permitting air to flow from the vacuum chamber 44 into the intake manifold 47, is arranged in the vacuum conduit 48. In addition, the vacuum chamber 44 is connected to the atmosphere via an atmosphere conduit 50 and a control valve 51. This control valve 51 comprises a vacuum chamber 53 and an atmospheric pressure chamber 54 which are separated by a diaphragm 52. In addition, the control valve 51 further comprises a valve chamber 55 arranged adjacent to the atmospheric pressure chamber 54. The valve chamber 55 is connected, at one end, to the vacuum chamber 44 via the atmosphere conduit 50 and, at the other end, to the atmosphere via a valve port 56 and an air filter 57. A valve body 58, controlling the opening operation of the valve port 56, is arranged in the valve chamber 55 and connected to the diaphragm 52 via a valve rod 59. A compression spring 60 for biasing the diaphragm 52 is inserted into the vacuum chamber 53, and the vacuum chamber 53 is connected to a venturi portion 62 of the primary carburetor A via a vacuum conduit 61.

The carburetor 46 is a conventional carburetor. Consequently, when the opening degree of a primary throttle valve 63 is increased beyond a predetermined degree, a secondary throttle valve 64 is opened. When the primary throttle valve 63 is fully opened, the secondary throttle valve 64 is also fully opened. The level of vacuum produced in the venturi portion 62 of the primary carburetor 46a is increased as the amount of air fed into the cylinder of the engine is increased. Consequently, when a great vacuum is produced in the venturi portion 62, that is, when the engine is operating at a high speed under a heavy load, the diaphragm 52 of the control valve 51 moves toward the right in FIG. 11 against the comPression spring 60. As a result, the valve body 58 opens the valve port 56. Thus, the vacuum chamber 44 of the diaphragm apparatus 40 becomes open to the atmosphere. At this time, the diaphragm 41 moves downward in FIG. 11 due to the spring force of the compression spring 45 and, thus, the rotary valve 25 is rotated and fully opens the bypass passage 24.

On the other hand, in the case wherein the opening degree of the primary throttle valve 63 is small, since the vacuum produced in the venturi portion 62 is small, the diaphragm 52 of the control valve 51 moves toward the left in FIG. 11 due to the spring force of the compression spring 60. As a result, the valve body 58 closes the valve port 56. In addition, in the case wherein the opening degree of the primary throttle valve 63 is small, a great vacuum is produced in the intake manifold 47. Since the check valve 49 opens when the level of vacuum produced in the intake manifold 47 becomes greater than that of the vacuum produced in the vacuum chamber 44, and since the check valve 49 closes when the level of the vacuum produced in the intake manifold 47 becomes smaller than that of the vacuum produced in the vacuum chamber 44, the level of the vacuum in the vacuum chamber 44 is maintained at the maximum vacuum which has been produced in the intake manifold 47 as long as the control valve 51 remains closed. If a vacuum is produced in the vacuum chamber 44, the diaphragm 41 moves upward in FIG. 11 against the compression spring 45. As a result, the rotary valve 25 is rotated and closes the bypass passage 24. Consequently, when the engine is operating at a low speed under a light load, the bypass passage 24 is closed by the rotary valve 25. In the case wherein the engine speed is low even if the engine is operating under a heavy load, and in the case wherein the engine is operating under a light load even if the engine speed is high, since the vacuum produced in the venturi portion 62 is small, the control valve 51 remains closed. Consequently, when the engine is operating at a low speed under a heavy load and at a high speed under a light load, since the level of the vacuum in the vacuum chamber 44 is maintained at the above-mentioned maximum vacuum, the bypass passage 24 is closed by the rotary valve 25.

As mentioned above, when the engine is operating at a low speed under a light load, that is, when the amount of air fed into the cylinder of the engine is small, the rotary valve 25 closes the bypass passage 24. At this time, a part of the mixture introduced into the inlet passage portion A moves forward along the upper walls 19, 20. In addition, at this time, the remaining part of the mixture impinges upon the rotary valve 25, and the flow direction thereof is deflected toward the side wall 17 of the inlet passage portion A. Then, the remaining part of the mixture moves forward along the side wall 15 of the helical portion B. As mentioned above, since the widths of the upper walls 19, 20 are gradually reduced toward the narrow passage portion 16, the cross-section of the flow path of the mixture flowing along the upper walls 19, 20 is gradually reduced toward the narrow passage portion 16. Thus, the velocity of the mixture flowing along the upper walls 19, 20 is gradually increased. In addition, as mentioned above, since the first side wall 14a of the separating wall 12 extends to a position near the side wall 15 of the helical portion B, the mixture flowing along the upper walls 19, 20 is compulsorily led onto the side wall 15 of the helical portion B and then moves forward along the side wall 15. As a result, a strong swirl motion is created in the helical portion B. Then, the swirling mixture flows into the combustion chamber 4 via the valve gap formed between the intake valve 5 and its valve seat and causes a strong swirl motion in the combustion chamber 4.

As mentioned above, when the engine is operating under a light load at a low speed, a part of the mixture impinges upon the valve body 31. Consequently, at this time, if no clearance is provided between the bottom wall 21 and the lower end of the valve body 31, between the side wall 27 and the peripheral edge 31a of the valve body 31 and between the second side wall 14b and the peripheral edge 31b of the valve body 31, the impurity such as gum substances contained in the mixture is deposited between the bottom wall 21 and the valve body 31, between the side wall 27 and the valve body 31 and between the second side wall 14b and the valve body 31. This results in a problem in that the valve body 31 is stuck onto the bottom wall 21, the side wall 17 and the second side wall 14b. Consequently, in the present invention, in order to eliminate such a problem, the impurity such as gum substances is prevented from being deposited in such a way that gaps are formed between the bottom wall 21 and the lower end of the valve body 31, between the side wall 27 and the peripheral edge 31a of the valve body 31, and between the second side wall 14b and the peripheral edge 31b of the valve body 31. However, in the case where such gaps are formed by merely reducing the size of the valve body 31, since the amount of the mixture leaking through the gaps is increased, the swirl motion created in the helical portion B is weakened. Particularly, since the mixture, leaking through the gap between the side wall 27 and the peripheral edge 31a of the valve body 31, moves forward along the side wall 27, the mixture collides head-on with the swirling mixture in the helical portion B and causes the swirl motion to be weakened. Consequently, in the present invention, the amount of the mixture leaking through the gaps is minimized in such a way that the grooves 36, 38, and 39 are formed on the bottom wall 21, the side wall 27, and the second side wall 14b, respectively, and that the gaps between the valve body 31 and the walls 21, 27, 14b are formed within the grooves 36, 38, and 39, respectively. That is, in the case where the gap l is formed between the flat bottom wall 21 and the lower end of the valve body 31 as illustrated in FIG. 12(a), the mixture is able to easily pass through the gap l and, thus, the amount of the mixture leaking through the gap l is increased. Contrary to this, as illustrated in FIGS. 12(b), in the case where the groove 36 is formed on the bottom wall 21, and the gap l having a size which is the same as that of the gap l illustrated in FIG. 12(a) is formed between the bottom wall of the groove 36 and the lower end of the valve body 31, since the flow path of the mixture is caused to be bent as illustrated by the arrow in FIG. 12(b), the mixture is subjected to a large flow resistance and, thus, the amount of the mixture leaking through the gap l becomes small. FIG. 13 illustrates the relationship between the gap l and the intensity of the swirl motion. In FIG. 13, the ordinate S indicates the number of revolutions of the swirl motion per unit time, and the abscissa indicates the gap l. In addition, in FIG. 13, the solid line indicates the case where the groove 36 is formed on the bottom wall 21 as illustrated in FIGS. 7 and 12(b), and the broken line indicates the case where the groove 36 is not formed on the bottom wall 21 as illustrated in FIG. 12(a). As is understood from FIG. 13, in the case where the groove 36 is not formed on the bottom wall 21, if the gap l is increased, the number of revolutions of the swirl motion S is accordingly reduced. Contrary to this, in the case where the groove 36 is formed on the bottom wall 21, if the gap l is less than 10 mm, the number of revolutions of the swirl motion S is not reduced. Consequently, from FIG. 13, it is understood that, if the groove 36 is formed on the bottom wall 21, and the gap l is less than 10 mm, it is possible to obtain the swirl motion having an intensity which is the same as that of the swirl motion created when the gap formed between the bottom wall 21 and the lower end of the valve body 31 is completely closed.

Figure 14:
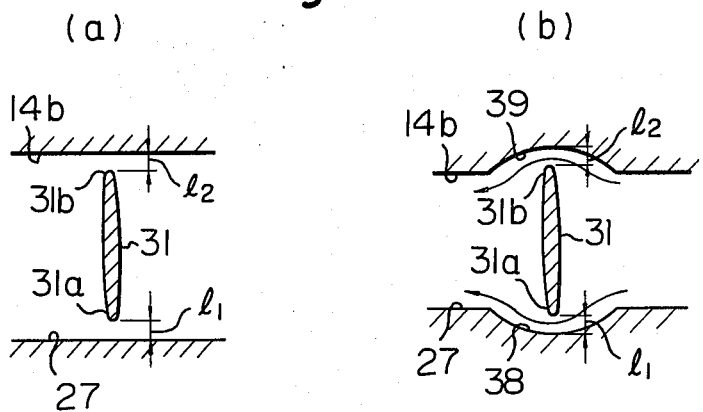
FIGS. 14(a) and 14(b) are plan views of the bypass passage illustrating the stream of mixture.
Figure 15:
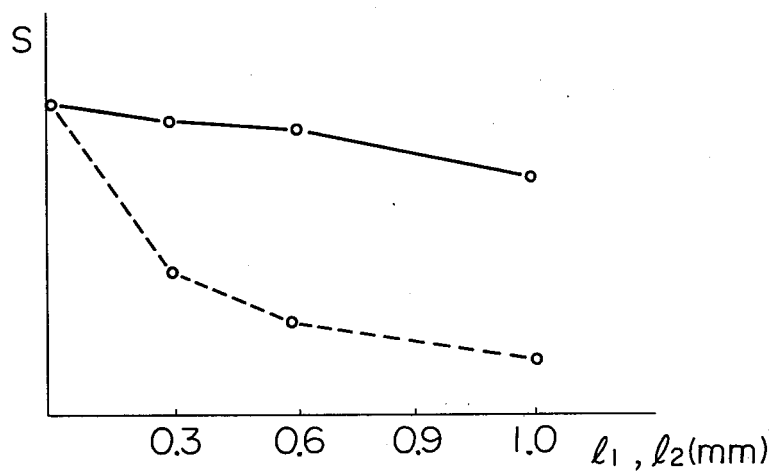
FIG. 15 is a diagram of the intensity of the swirl motion.

On the other hand, as illustrated in FIG. 14(a), in the case where the gaps $l_1$ and $l_2$ are formed between the side wall 27 and the peripheral edge 31a of the valve body 31 and between the second side wall 14b and the peripheral edge 31b of the valve body 31, respectively, the mixture is able to easily pass through the gaps $l_1$ and $l_2$ and, thus, the amount of the mixture leaking through the gaps $l_1$ and $l_2$ is increased. Contrary to this, as illustrated in FIG. 14(b), in the case where the grooves 38 and 39 are formed on the side wall 27 and the second side wall 14b, respectively, and the gaps $l_1$ and $l_2$ having a size which is the same as that of the gaps $l_1$ and $l_2$ illustrated in FIG. 14(a) are formed between the side wall of the groove 38 and the peripheral edge 31a of the valve body 31 and between the side wall of the groove 39 and the peripheral edge 31b of the valve body 31, respectively, since the flow path of the mixture is caused to bend as illustrated by the arrow in FIG. 14(b), the mixture is subjected to a large flow resistance and, thus, the amount of the mixture leaking through the gaps $l_1$, $l_2$ becomes small. FIG. 15 illustrates the relationship between the gaps $l_1$, $l_2$ and the intensity of the swirl motion. In FIG. 15, the ordinate S indicates the number of revolutions of the swirl motion per unit time, and the abscissa indicates the gaps $l_1$ and $l_2$. In addition, in FIG. 15, the solid line indicates the case where the grooves 38 and 39 are formed on the side wall 27 and the second side wall 14b, respectively, as illustrated in FIGS. 2 and 14(b), and the broken line indicates the case where the grooves 38 and 39 are not formed on the side wall 27 and the second side wall 14b, respectively, as illustrated in FIG. 14(a). As is understood from FIG. 15, in the case where the grooves 38 and 39 are not formed on the side wall 27 and the second side wall 14b, respectively, if the gaps $l_1$, $l_2$ are increased, the number of revolutions the swirl motion S is accordingly reduced. Contrary to this, in the case where the grooves 38 and 39 are formed on the side wall 27 and the second side wall 14b, respectively, even if the gaps $l_1$, $l_2$ are increased, the number of revolutions of the swirl motion S is not reduced too much. From FIG. 13, it is understood that it is preferable that the gaps $l_1$, $l_2$ be less than 0.6 mm.

When the engine is operating at a high speed under a heavy load, that is, when the amount of air fed into the cylinder of the engine is large, since the rotary valve 25 opens the bypass passage 24, the mixture introduced into the inlet passage portion A is divided into three mixture streams. That is, the first mixture stream is a mixture stream flowing into the intake port 6 between the first side wall 14a of the separating wall 12 and the side wall 17 of the inlet passage portion A and then flowing, while swirling, along the upper wall 17 of the helical portion B. The second mixture stream is a mixture stream which flows into the helical portion B through the bypass passage 24. The third mixture stream is a mixture stream which flows into the helical portion B along the bottom wall 21 of the inlet passage portion A. The flow resistance of the bypass passage 24 is smaller than that of the flow path formed between the first side wall 14a and the side wall 17 and, thus, the amount of the second mixture stream becomes larger than that of the first mixture stream. In addition, the flow direction of the first mixture stream flowing, while swirling, within the helical portion B is deflected downward by the second mixture stream and, thus, the swirl motion of the first mixture stream is weakened. As mentioned above, since the amount of the mixture which flows within the bypass passage 24 having a small flow resistance is increased, and the flow direction of the first mixture stream is deflected downward, it is possible to obtain a high volumetric efficiency. In addition, as mentioned above, since the bottom face 22 of the separating wall 21 is inclined so as to be directed downward, the third mixture stream is guided by the bottom face 22 of the separating wall 21 so that the flow direction of the third mixture stream is deflected downward. Thus, it is possible to obtain an even higher volumetric efficiency.

In the present invention, the intake port 6 can be formed by forming the separating wall 12 in one piece on the upper wall of the intake port 6. Consequently, it is possible to easily manufacture the helically-shaped intake port.

According to the present invention, when the engine is operating under a light load at a low speed, since the mixture is prevented from being leaked into the bypass passage while preventing the impurity such as gum from being deposited on the valve body, it is possible to create a strong swirl motion in the combustion chamber. When the engine is operating under a heavy load at a high speed, since the bypass passage is opened, a large amount of the mixture flows into the helical portion via the bypass passage having a low flow resistance. Therefore, it is possible to obtain a high volumetric efficiency.

While the invention has been described by reference to a specific embodiment chosen for the purpose of illustration, it should be apparent that numerous modifications can be made thereto by those skilled in the art without departing from the basic concept and scope of the invention.

We claim:

1. An intake device of an internal combustion engine comprising:
    an intake valve having a valve stem;
    an axially extending intake port passage having an inlet opening at one end thereof and having an outlet opening at the other end thereof, said intake port passage having a substantially cylindrically extending circumferential wall which circumferentially extends about said valve stem, a first side wall which extends between said inlet opening and said circumferential wall along an axis of said intake port passage, a second side wall which extends between said inlet opening and said circumferential wall along the axis of said intake port passage and is arranged to face said first side wall, an upper wall which extends between said inlet opening and said circumferential wall along the axis of said intake port passage, and a bottom wall which extends between said inlet opening and said circumferential wall along the axis of said intake port passage;
    a separating wall projecting downward from said upper wall and spaced from said bottom wall, said separating wall extending along the axis of said intake port passage and being spaced from said circumferential wall for defining a helical portion having a helix terminating portion between said separating wall and said circumferential wall, said separating wall being spaced from said first side wall for defining therebetween an inlet passage portion tangentially connected to said helical portion, said separating wall being spaced from said second side wall for defining therebetween a bypass passage which interconnecting said inlet passage portion to said helix terminating portion;
    a normally closed rotary valve arranged in said bypass passage and having a thin plate-shaped valve body which extends between said upper wall and said bottom wall for controlling the flow area of said bypass passage, said bottom wall having a groove formed thereon, said valve body having a lower end which is located in said groove; and
    an actuating means for actuating said rotary valve in response to the change in the operating condition of the engine to open said rotary valve when the engine is operating at a high speed under a heavy load.

2. An intake device according to claim 1, wherein said groove has a conical shape.

3. An intake device according to claim 2, wherein the lower end of said valve body comprises a central flat portion and inclined portions arranged on each side of said central flat portion and slightly spaced from the bottom wall of said groove.

4. An intake device according to claim 1, wherein said second side wall is substantially vertically arranged, and said separating wall has a substantially vertical side wall defining said bypass passage, a first cylindrical groove and a second cylindrical groove being formed on said second side wall and the side wall of said separating wall, respectively, and circumferentially extending about an axis of said rotary valve, the valve body of said rotary valve having opposed peripheral edges which are located in said first cylindrical groove and said second cylindrical groove, respectively, when said rotary valve is closed.

5. An intake device according to claim 4, wherein the peripheral edges of said valve body are slightly spaced from the walls of said first cylindrical groove and said second cylindrical groove, respectively, when said rotary valve is closed.

6. An intake device according to claim 4, wherein said first cylindrical groove and said second cylindrical groove have the same radius, the center of which is located on the axis of said rotary valve.

7. An intake device according to claim 1, wherein said separating wall has a transverse width which is gradually increased toward said helical portion.

8. An intake device according to claim 1, wherein said separating wall extends to a position near said circumferential wall for defining a narrow passage portion therebetween.

9. An intake device according to claim 8, wherein said upper wall, located between said separating wall and said circumferential wall, has a width which is gradually increased from said narrow passage portion toward said helix terminating portion.

10. An intake device according to claim 1, wherein said separating wall has an inclined side wall defining said inlet passage portion and directed downward.

11. An intake device according to claim 1, wherein said separating wall has a bottom face spaced from the bottom wall of said intake port passage and gradually leaving from the upper wall of said intake port passage and gradually leaving from the upper wall of said intake port passage as the bottom face of said separating wall approaches said helical portion.

12. An intake device according to claim 1, wherein said upper wall, located between said separating wall and said first side wall, has a width which is gradually reduced toward said helical portion.

13. An intake device according to claim 1, wherein said first side wall is substantially vertically arranged.

14. An intake device according to claim 1, wherein said bottom wall has an inclined portion located adjacent to said first side wall, the inclined angle of said inclined portion being gradually increased toward said helical portion.

15. An intake device according to claim 1, wherein said bypass passage has an inlet portion which is open to said inlet passage portion, said rotary valve being arranged in said inlet portion.

16. An intake device according to claim 1, wherein said actuating means actuates said rotary valve in response to the amount of air fed into said intake port passage and opens said rotary valve when said amount of air is increased beyond a predetermined value.

17. An intake device according to claim 16, wherein said actuating means comprises a vacuum chamber, a diaphragm connected to said rotary valve and actuated in response to a change in the level of the vacuum in said vacuum chamber, and a control apparatus maintaining the level of the vacuum in said vacuum chamber at the maximum vacuum which has been produced in the intake port passage when the amount of air fed into the intake port passage is smaller than said predetermined value and connecting said vacuum chamber to the atmosphere when said amount of air is larger than said predetermined value.

18. An intake device according to claim 17, wherein said control apparatus comprises a check valve arranged between the intake port passage and said vacuum chamber for allowing only the outflow of air from said vacuum chamber, and a control valve for controlling the fluid connection between said vacuum chamber and the atmosphere to connect said vacuum chamber to the atmosphere when said amount of air is larger than said predetermined value.

19. An intake device according to claim 18, wherein the engine comprises a carburetor connected to the intake port passage and having a venturi portion, said control valve being actuated in response to a change in the level of the vacuum produced in said venturi portion.

20. An intake device according to claim 18, wherein said control valve comprises a valve body for controlling the fluid connection between said vacuum chamber and the atmosphere, a vacuum cavity connected to said venturi portion, and a diaphragm connected to said valve body and actuated in response to a change in the level of the vacuum produced in said vacuum cavity.

* * * * *